Oct. 7, 1930.  J. C. ZEDER  1,777,423
BRAKE PRESSURE TESTING MACHINE
Filed Nov. 8, 1926  2 Sheets-Sheet 1

INVENTOR
JAMES C ZEDER
BY
ATTORNEY

Oct. 7, 1930.                J. C. ZEDER                1,777,423
                    BRAKE PRESSURE TESTING MACHINE
               Filed Nov. 8, 1926        2 Sheets-Sheet 2
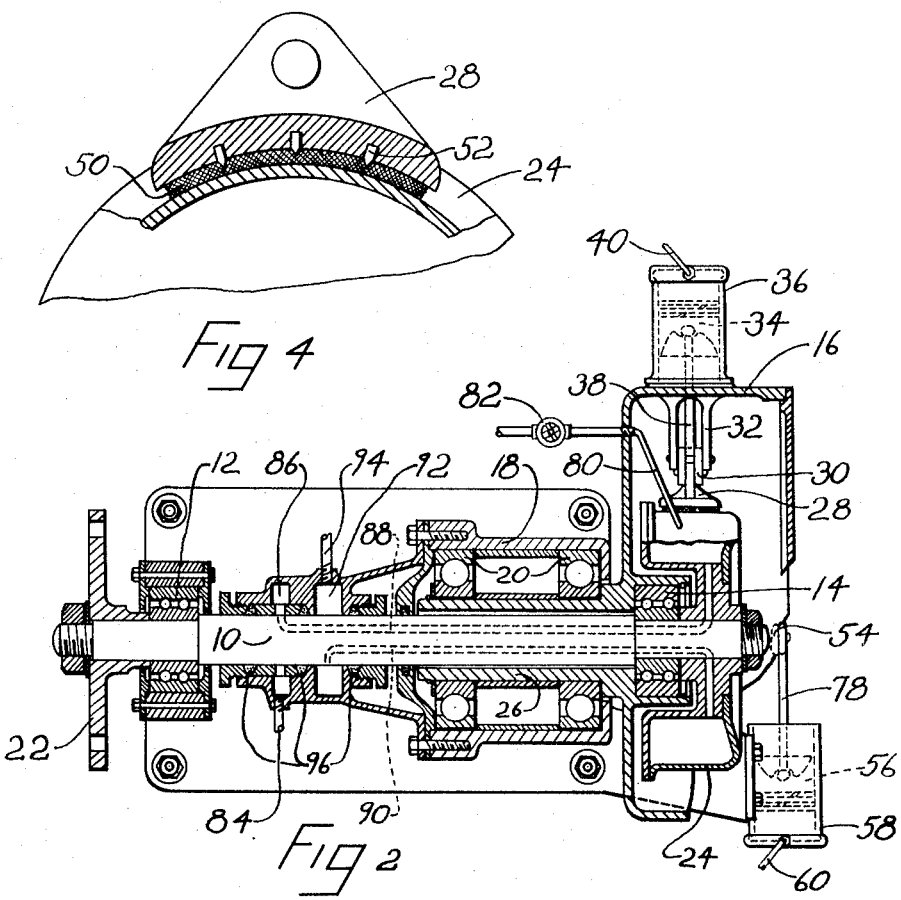
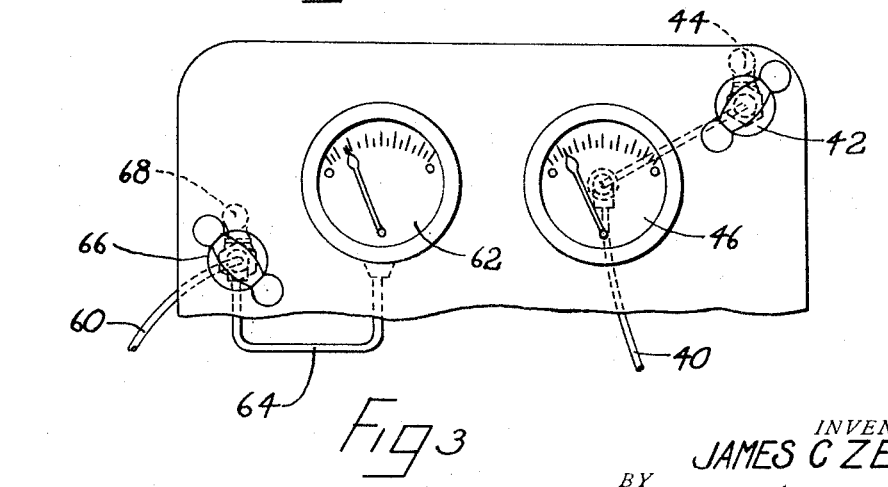
INVENTOR
JAMES C ZEDER
BY
ATTORNEY Patented Oct. 7, 1930

1,777,423

UNITED STATES PATENT OFFICE

JAMES C. ZEDER, OF DETROIT, MICHIGAN, ASSIGNOR TO CHRYSLER CORPORATION, OF DETROIT, MICHIGAN, A CORPORATION OF DELAWARE

BRAKE-PRESSURE-TESTING MACHINE

Application filed November 8, 1926. Serial No. 146,891.

It is the primary object of this invention to provide a machine for testing the quality and coefficient of friction of frictional surfaces or the relative coefficient of friction between different frictional surfaces.

Considerable variances are found in the quality of frictional surfaces. Taking for example, brake linings, some may have a high coefficient of friction but poor wearing qualities, while others may have a low coefficient of friction and good wearing qualities, neither of which are desirable for commercial use, particularly for use as brake band linings on motor vehicles.

An important object of this invention is to test frictional surfaces for both wearing quality and coefficient of friction by subjecting the surfaces to the same conditions as exist when the surfaces are in use and accelerating the results of ordinary usage.

Another object of the invention is to rotate a drum with the surface in frictional engagement therewith. Means have been provided for varying and recording the amount of pressure exerted on the frictional surfaces and means for recording the amount of frictional grip has been provided, illustrated by recording the pressure caused by limited angular movement of the supporting mechanism for a brake lining with the drum.

A further object is to cool the drum, illustrated by causing a circulation of water through the interior of the drum.

Other objects and advantages will more fully appear from the following description taken in connection with the accompanying drawings in which:

Fig. 2 is a sectional view on line 2—2 of Fig. 1.

Fig. 3 is a fragmentary view of the panel which supports the indicating instruments and controls.

Fig. 4 is a detail in section showing a means for securing a lining to be tested to the shoe.

Figure 1:
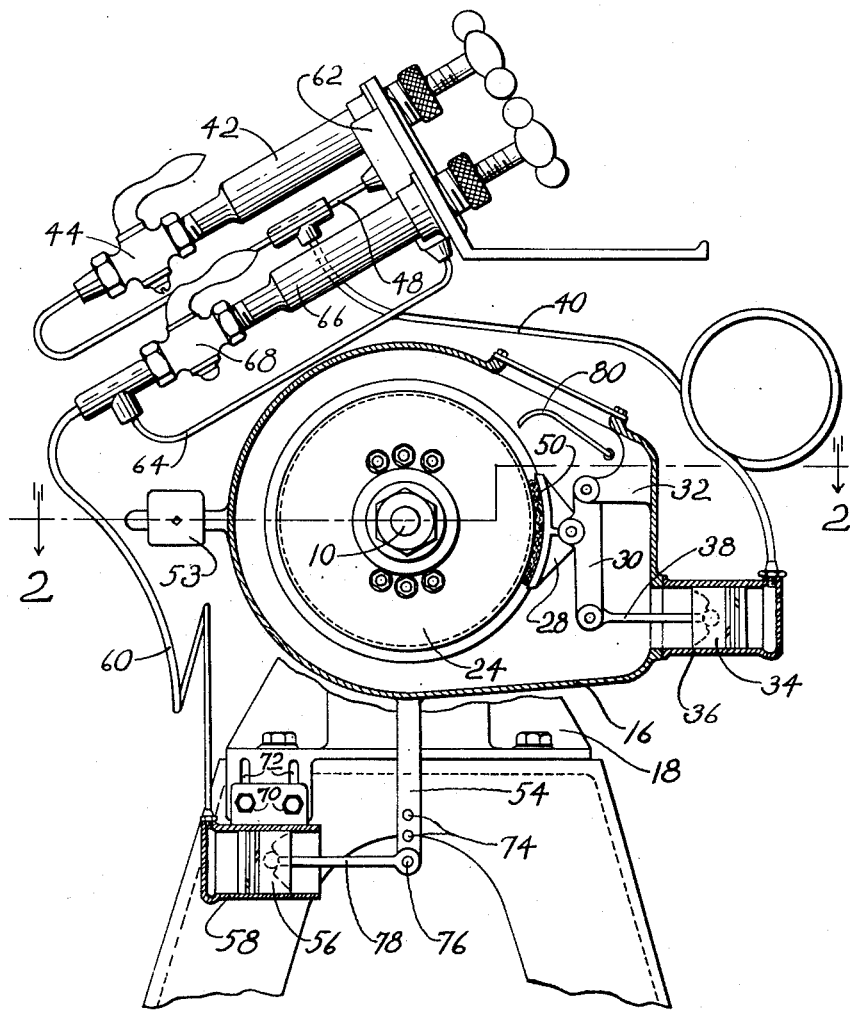
Fig. 1 is an end view of the machine, parts being broken away and parts in section.

Referring to the illustrated embodiment of my invention, a rotatable shaft 10 is journaled in a bearing 12 at one end and has its opposite end journaled in a bearing 14 carried by a rotatable support 16 which is journaled in the base 18 by the bearings 20. At one end of the shaft 10, a driving connection 22 is secured adapted to be connected to a driving means, not shown. The opposite end of the shaft 10 is provided with a drum 24, rotatable therewith.

The support 16 is provided with a sleeve portion 26 around the shaft 10 and is independently rotatable within the bearings 20. A brake shoe 28 is pivotally supported on a swinging link 30. The latter is pivotally supported on a flange 32 of the support 16. A piston 34 reciprocating in a cylinder 36, carried by the support 16, is connected to the link 30 by a rod 38 and movement of the piston 34 causes the shoe to be brought into frictional engagement with the drum 24 or to be retracted therefrom. The piston is operated by a fluid pressure in a line 40. The pressure is obtained by means of a pump 42. A valve 44, between the pump 42 and line 40, when closed, maintains a given pressure built up by the pump. The pressure is recorded by a pressure gauge 46 through a connection 48 to the line 40.

A section of a brake lining 50 is placed on the shoe 28, between the drum and shoe, and pins 52 securely hold the lining in position against slipping.

It will be understood that by applying a pressure in the line 40 the lining 50 will be in frictional engagement with the rotating drum 24 and the friction will cause the shoe, its connections and the support 16 to tend to rotate with the drum 24. An adjustable weight 53 has been provided to return the support to its normal position when the pressure in the line 40 is relieved.

An arm 54 carried by the housing 16 is connected to a piston 56 reciprocating in a cylinder 58 secured to the support 18. Another pressure line 60 is in communication with the cylinder 58 and the pressure in this line is recorded by a pressure gauge 62 through a connection 64. A pump 66 is provided with a valve 68 for supplying the line 60 with fluid.

Any rotation of the support 16 with the drum 24 in a clockwise direction will cause a pressure in the cylinder 58 and line 60 to be built up and recorded on the gauge 62.

An adjustment has been provided for the cylinder 58 which comprises a pair of bolts 70 adapted to engage slots 72 in the base 18. The arm 54 is provided with apertures 74, one of which receives the pin 76 securing the connecting rod 78. Thus the effective length of the arms 54 may be varied.

The amount of frictional grip of the lining on the drum can be measured in pounds by the above described arrangement and in comparing one lining with another, a constant pressure is maintained on the shoe 28 and the difference in frictional grip is determined by the difference in pressures recorded on the gauge 62. When different linings are run each for an equal given length of time the difference in pressures is recorded on the gauge 46. This difference in pressures is due to the wearing away of one lining more than the other, which consequently causes a drop in the pressure.

To properly duplicate conditions where the brake is exposed to moisture a pipe 80 has been provided in the support 16 which supplies a stream of liquid to the drum and lining. The supply is controlled by a valve 82 and if it is desired to test the lining or frictional grip on a dry surface the valve may be closed shutting off the supply of liquid.

A passage has been provided through which water or any other cooling medium may pass to cool the drum. The passage comprises an inlet conduit 84 communicating with an annular chamber 86 in the support 18. A passage 88 in the shaft 10 conducts the liquid to the interior of the drum 24 and a passage 90 returns the liquid from the drum to an annular chamber 92 and out through a conduit 94. Suitable packing glands 96 are provided around the shaft 10.

While the above description has been directed to one specific embodiment of my invention, it is to be understood that various changes including size and arrangement of parts may be made without departing from the spirit thereof and it is not my intention to limit its scope other than by the terms of the appended claims.

What I claim is:

1. In a testing machine of the class described comprising, a rotatable drum, pressure controlled means adapted to frictionally engage said drum, fluid pressure controlled means for resisting the angular movement of said first named means with said drum, and means for indicating said pressures.

2. In a testing machine of the class described comprising, a rotatable drum, a pressure controlled shoe having a lining adapted for frictional engagement with said drum, a rotatable support for said shoe co-axial with said drum, fluid pressure means for resisting the angular movement of said support, and means for indicating the amount of said fluid pressure.

3. In a testing machine of the class described comprising, a rotatable drum, a pressure controlled shoe having a lining adapted for frictional engagement with said drum, means for indicating the pressure on said shoe, a rotatable support for said shoe co-axial with said drum, fluid pressure means for resisting the angular movement of said support, and means for indicating the amount of resistance to movement of said support.

4. In a testing machine of the class described comprising, a rotatable drum, a rotatable support, coaxial with said drum, a shoe carried by said support and having a lining adapted for frictional engagement with said drum, a pressure controlled chamber carried by said support, a piston in said chamber operatively connected to said chamber, a stationary pressure chamber, a piston connected to said support reciprocating in said stationary pressure chamber, and means for indicating the pressure in said last named chamber caused by the angular movement of said support and piston.

5. In a testing machine of the class described comprising, a rotatable drum, a shoe having a lining adapted for frictional engagement with said drum, a rotatable support for said shoe co-axial with said drum, fluid pressure means for resisting the angular movement of said support, means for indicating a pressure caused by the resistance of said support, and means for varying the proportion of said pressure indication to the resistance on said support.

JAMES C. ZEDER.